United States Patent [19]
Seibt et al.

[11] 3,742,371
[45] June 26, 1973

[54] WIDE RANGE REGULATED POWER SUPPLY UTILIZING OPTIMIZED ENERGY STORAGE

[75] Inventors: Arthur H. Seibt, Portland; Frank T. Churchill, Beaverton, both of Oreg.

[73] Assignee: Tektronix, Inc., Beaverton, Oreg.

[22] Filed: Dec. 16, 1971

[21] Appl. No.: 208,992

Related U.S. Application Data
[63] Continuation of Ser. No. 16,340, March 4, 1970.

[52] U.S. Cl............................ 321/2, 321/11, 321/18, 321/27
[51] Int. Cl. ............................................. H02m 3/32
[58] Field of Search .................... 321/2, 4, 11, 18, 321/27; 331/112

[56] References Cited
UNITED STATES PATENTS

| | | | |
|---|---|---|---|
| 3,510,748 | 5/1970 | Sakamoto et al. | 321/27 R |
| 3,586,957 | 6/1971 | Cass | 321/2 |
| 3,551,777 | 12/1970 | Bingley | 321/2 |
| 3,614,587 | 10/1971 | Schwarz | 321/2 |
| 3,562,623 | 2/1971 | Farnsworth | 321/2 |
| 3,596,165 | 7/1971 | Andrews | 321/2 |
| 3,474,325 | 10/1969 | Schaefer | 321/2 X |
| 3,219,906 | 11/1965 | Keller et al. | 321/2 X |
| 3,584,289 | 6/1971 | Bishop | 321/11 |

*Primary Examiner*—William H. Beha, Jr.
*Attorney*—Blore et al.

[57] ABSTRACT

A fly-back type power supply includes a transformer, the primary winding of which is periodically connected to a DC source to establish current through such winding. When this current increases to a predetermined optimum value, the current flow through the primary winding is interrupted for producing collapse of the transformer's magnetic field and generation of an output in the transformer's secondary windings. The frequency at which the primary is periodically connected to the DC source is controlled by a secondary output voltage such that the frequency is increased when such output voltage tends to decrease. A plurality of secondary windings are each connected to a rectifier and filter capacitor combination, wherein the filter capacitors are coupled in series for production of a high voltage output.

11 Claims, 8 Drawing Figures

Patented June 26, 1973

ARTUR H. SEIBT
FRANK T. CHURCHILL
INVENTORS.

BY
BUCKHORN, BLORE, KLARQUIST & SPARKMAN
ATTORNEYS

ARTUR H. SEIBT
FRANK T. CHURCHILL
INVENTORS.

BY
BUCKHORN, BLORE, KLARQUIST & SPARKMAN
ATTORNEYS

WIDE RANGE REGULATED POWER SUPPLY UTILIZING OPTIMIZED ENERGY STORAGE

This is a continuation, of application Ser. No. 16,340, filed 3/4/70.

BACKGROUND OF THE INVENTION

High voltage fly-back type power supplies for portable electronic equipment are frequently provided with electronic voltage regulator means, particularly when such equipment is used for measuring purposes. For example, in the case of a portable cathode ray oscilloscope, it is essential that the high voltages applied to the cathode ray tube electrodes be held within reasonably close limits. A prior fly-back circuit for developing a predetermined voltage included a controlled oscillator for varying the frequency of power supply operation. The current in the fly-back transformer's primary winding was allowed to build up during each cycle, before interruption, to a current value appropriate for generation of a particular output voltage. When the output voltage tended to drop, the frequency of the periodic energization and interruption of the transformer's primary circuit was decreased, so the transformer would "charge up" to a higher current value during successive cycles. Although the number of chargings during a given time thereby decreases, the overall output increases as a result of increased current level achieved, inasmuch as the energy stored per pulse depends upon the square of the current.

Unfortunately, control loop gain is poor in the aforementioned type of circuit, and the transformer is never charged to its full energy storage capability. Furthermore, the circuit is limited in the range of input supply voltages it will accept, with the frequency of fly-back operation being sensitive to both line input changes and load changes. The limitation is a result of limits in operating frequency range of the circuit. Although load changes in the case of a cathode ray oscilloscope are easily accommodated, it would be desirable if the power supply could operate within wide limits of input voltage. For example, it would be desirable if such a power supply could operate either from any available AC line or from batteries. Unfortunately, line voltages as well as line frequencies vary widely in different parts of the world, presently making it necessary that different equipment be manufactured for different countries or areas of usage.

SUMMARY OF THE INVENTION

According to the present invention, a power supply provides a predetermined output which is substantially independent of the input voltage applied thereto from an input source. The power supply includes a transformer means having a primary winding with control means operably connected to such primary winding for periodically initiating current flow through the primary winding from the input source. Means detect the rising value of current is the primary winding, and always interrupts such current for the production of an output surge when the current reaches a predetermined value, substantially independent of the input voltage received. The transformer is thereby utilized to its maximum energy storage capacity, and only the length of time changes for the transformer's primary winding to charge up each time to its given optimum current value during each cycle of operation. Then, when this current is interrupted, substantially the same energy is always available for generating an output surge. It is found in practice that this power supply can generate a high output voltage substantially independently of the input supply voltage available within several hundred volts of line input variation. For example, in a typical embodiment according to the present invention, the input may vary from 100 volts DC to 400 volts DC. The 100 to 400 volts DC mentioned above is typically derived via a rectifier supply from an AC line voltage which may vary through a range of 90 to 272 volts rms or greater, with an input frequency of 48 Hertz or above.

In order to accommodate load changes such as may affect the final filtered DC output produced, an additional voltage control may be provided in an embodiment according to the present invention. According to this embodiment, the frequency of periodic connection of the transformer primary to the input source is controlled. Thus, as the final output voltage tends to drop due to an increase in load, the frequency of periodic energization of the transformer primary is increased. It is noted this change in input frequency with load increase varies in an opposite sense from the prior art circuit. Then, again, each time the primary circuit is energized, the length of time of such energization depends upon the line input provided for charging the transformer to a given energy level.

Further in accordance with a preferred embodiment of the present invention, a high voltage output is derived from a plurality of secondary windings, each driving an output rectifier and filter capacitor or the like. The filter capacitors associated with plural secondary windings are connected in series to result in a given high voltage output. As a result, the high voltage output is found to be inherently more stable with load changes. This circuit results in a high voltage output supply of comparatively low impedance, to which a dissipative regulator may be connected if so desired, whereas prior art connections employing a single high voltage winding, or high voltage multiplier means, did not involve this type of simple control, but rather required more complex circuitry.

It is accordingly an object of the present invention to provide an improved, wide range, regulated power supply.

It is a further object of the present invention to provide an improved high voltage power supply capable of operation over a wide range of input line voltages.

It is a further object of the present invention to provide an improved, regulated, fly-back type power supply of enhanced efficiency.

It is another object of the present invention to provide an improved high voltage power supply of economical construction and including a transformer of minimized size as a result of the transformer always being utilized to full energy storage capability regardless of line input changes and load changes.

It is a further object of the present invention to provide an improved, regulated, fly-back type, high voltage power supply having high regulation loop gain.

It is a further object of the present invention to provide an improved regulated high voltage power supply wherein the line and load circuitry are isolated one from the other.

It is a further object of the present invention to provide an improved, high voltage, fly-back type power supply wherein the high voltage output is provided at a comparatively low impedance level and which high voltage output may be easily reregulated if so desired.

The subject matter which we regard as our invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 1:
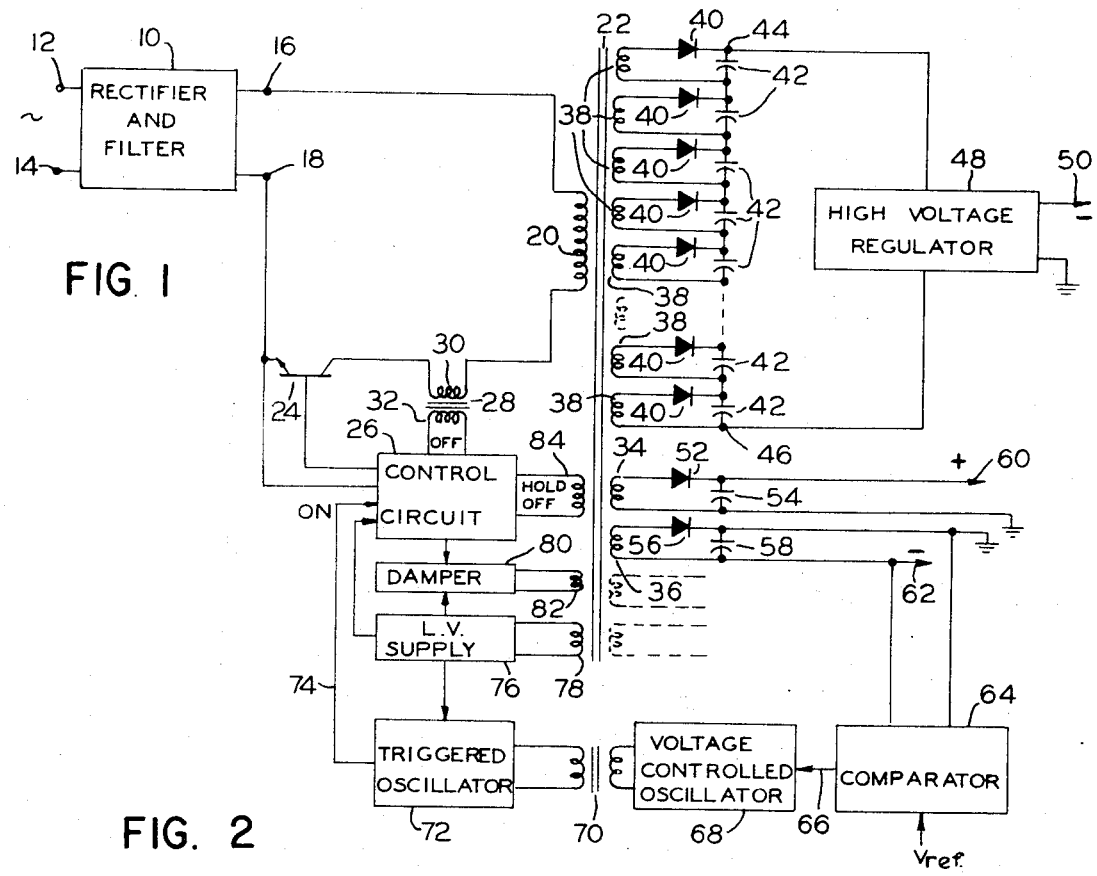
FIG. 1 is a block diagram of a high voltage power supply according to the present invention.

Referring to FIG. 1, a power supply in accordance with the present invention includes a rectifier and filter 10 receiving a line input at terminals 12 and 14 and delivering a corresponding filtered output at terminals 16 and 18. The input is generally an alternating current available from the local service outlet. The output terminals 16 and 18 are coupled in energizing relation to primary winding 20 of high voltage transformer 22. While terminal 16 is connected directly to one end of inductive winding 20, terminal 18 is coupled to control means for periodically completing a circuit between rectifier and filter 10 and winding 20. Such control means here includes an NPN power transistor 24 having its emitter coupled to terminal 18 and its collector coupled to the remaining end of winding 20. The control means also includes a control circuit 26 as well as a current sensing transformer 28 having its primary winding 30 serially interposed between the collector of transistor 24 and winding 20. The secondary winding 32 of transformer 28 is coupled in operative relation to control circuit 26. Transformer 28 causes control circuit 26 to disable power transistor 24 when current in winding 20 reaches a predetermined optimum value.

Transformer 22 also includes low voltage secondary windings 34 and 36 as well as a plurality of secondary windings 38, each having a rectifier 40 disposed in series between each such winding and a filter capacitor 42 or other filter means. The filter capacitors are connected in series as shown so that a high DC voltage is derived across the series connection, i.e. between terminals 44 and 46. A dissipative high voltage regulator 48 may receive the high voltage output from terminals 44 and 46 for delivering a further regulated high voltage output at connection 50 with respect to ground. High voltage regulator 48 is suitably of the conventional series type which inserts more or less impedance in series with the output from terminals 44 and 46 in response to the output voltage at connection 50, for maintaining such output at connection 50 at a predetermined value within narrow limits. Such high voltage regulator 48 is of the type well known to those skilled in the art, and may or may not be employed, in accordance with the degree of regulation finally required.

Low voltage winding 34 is coupled through diode 52 to filter capacitor 54 while a similar diode 56 connects winding 36 to filter capacitor 58. Low voltage output of a positive polarity with respect to ground is derived from terminal 60 connected to one side of capacitor 54 while the remaining side of capacitor 54 is grounded. A negative voltage is supplied at connection 62 with respect to ground, said connection extending from the negative side of capacitor 58 while the positive side of capacitor 58 is grounded. Further windings may be provided on the transformer as desired, and as indicated in the drawing by means of dashed lines. Typically, ten windings 38 are connected as shown for generating a combined output at terminals 44 and 46 of approximately a minus 4 kilovolts. Thus, each of the windings 38 develops 400 volts across the respective capacitor 42. Windings 34 and 36 typically generate much lower voltages for operation of transistor circuitry, e.g. on the order of 10 to 250 volts.

A comparator 64 receives a DC output across capacitor 58 and compares this DC output with voltage reference $V_{ref}$ which may be derived from a voltage source such as a battery, Zener diode, or the like, in a conventional manner. Comparator circuits of this kind are well known by those skilled in the art. The comparator develops an output at 66 in accordance with such comparison for therewith controlling the low voltage at connection 62 so that the voltage at connection 62 will be retained within narrow limits, despite changes in load at this connection. Thus, in the present power supply, the low voltage at connection 62 was found to be the most critical in regard to the load serviced thereby, and it was therefore chosen to regulate the output voltage at this particular point. In general, regulation of this voltage will produce a desirable regulatory effect upon voltages derived from the other windings, although in some instances, a small reverse regulation effect may occur. In any case, the voltages derived from the other secondary windings will be found to remain within acceptable limits.

The output of comparator 64 at 66 is a voltage for controlling voltage-controlled oscillator 68 thereby the frequency of such oscillator increases as the voltage at 62 decreases, and vice versa. The output of oscillator 68 is coupled through pulse transformer 70 to triggered oscillator 72. Triggered oscillator 72 normally oscillates or free runs at a given frequency, but is triggered through pulse transformer 70 for operation at a higher and controlled frequency. Output 74 of oscillator 72 operates control circuit 26 at the controlled frequency of oscillator 72. For each cycle of operation of triggered oscillator 72, control circuit 26 applies an appropriate voltage at the base of power transistor 24 for completing a circuit between terminal 18 and winding 20. At such time, current will increase in winding 20 until a predetermined value of current is reached. Then this current is detected for operating control circuit 26 through transformer 28 for de-energizing power transistor 24. When the circuit to winding 20 is thus interrupted, the field built up in the core of transformer 22 collapses and produces a voltage in the various secondary windings which is opposite in polarity to the voltage induced therein when the current in winding 20 was increasing. This voltage surge is of a polarity that allows secondary rectifiers 40, 53, and 56 to conduct, and the stored magnetic energy is transferred to secondary filter capacitors 42, 54, and 58. The circuit operates at a comparatively high frequency, e.g. between 20 and 30 kilohertz, whereby the DC voltages across capacitors 42, 54, and 58 will be nearly constant.

A low voltage supply 76 is driven from winding 78 of transformer 22 and provides low voltage to triggered oscillator 72, control circuit 26, and damper 80. It is noted that the control portion of the circuitry on the primary side of transformer 22 is isolated from the secondary windings not only by transformer 22 but also by pulse transformer 70 disposed between oscillators 68 and 72. Thus, the instrument circuitry coupled to the secondary windings is isolated from the line.

Damper 80 is operated from control circuit 26 and inhibits ringing in transformer 22 at the conclusion of a surge generated when the current in winding 20 is interrupted by power transistor 24. At such time, the damper shorts winding 82 on the transformer for inhibiting transients. Holdoff winding 84 prevents the control circuit from reenergizing power transistor 24 until the conclusion of the fly-back surge for protection of transistor 24.

The present circuit is thus of the fly-back type wherein transformer 22 is "charged" through conduction of current in winding 20. When this current is interrupted, the energy in transformer 22 generates the "fly-back" voltage in the secondary windings to provide a comparatively high voltage source of power. Each time the control circuit is energized by triggered oscillator 72, the current through winding 20 comparatively gradually increases, because of the inductance involved, until a predetermined value is reached. Lead 74 is the "on" lead for control circuit 26 which turns on power transistor 24. The value of the optimum current is detected by means of transformer 28 which then causes the control circuit to turn "off" power transistor 24.

Figure 7A:
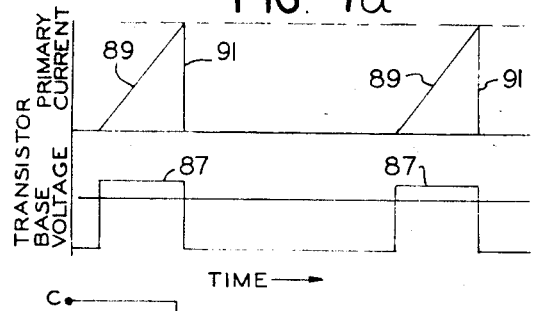
FIGS. 7a and 7b are charts of waveforms illustrating a change in operation of the present invention with change in load.
Figure 7B:
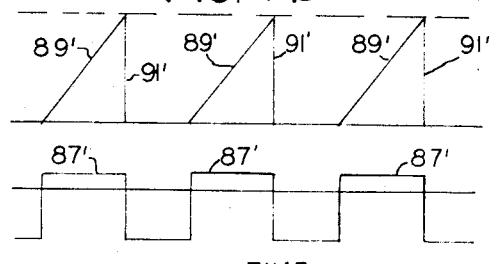

The frequency of the periodic "on" periods of transistor 24 is controlled according to the voltage appearing at connection 62. Typical operation is depicted in FIG. 7a, illustrating the base electrode voltage for power transistor 24 and the resulting current in primary winding 20. Each time the base voltage is turned on, as illustrated by waveforms 87, the current at 89 increases through winding 20. At the conclusion of the energization of transistor 24 at its base, the primary current falls at 91 causing the generation of the hereinabove mentioned fly-back surge of voltage as a result of collapse of the transformer field. Now, if the load increases at connection 62, the frequency of voltage controlled oscillator 68 and triggered oscillator 72 will be increased. More closely spaced pulses 87', illustrated in FIG. 7b, are then applied at the base of transistor 24. These result in rises and falls, 89' and 91!, in the primary current. The particular frequency increase depicted in FIG. 7b is for purpose of illustration only. It will be seen, however, that since a larger number of fly-back surges will be generated during a given time by the collapse of current illustrated by ramps 91', capacitor 58 will be charged more often, tending to raise the voltage at connection 62 to the desired value.

Figure 6:
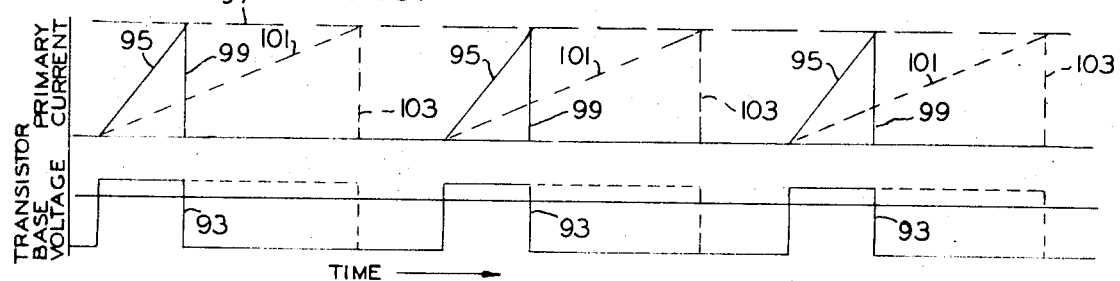
FIG. 6 is a first chart of waveforms illustrated operation of the present invention with change in input line voltage.

FIG. 6 illustrates changes in operation of the circuit for changes in input voltage present at terminals 16 and 18, which may be due to a decrease in AC voltage received at terminals 12 and 14. For a first voltage received, the power transistor 24 will receive pulses 93 at its base, illustrated in solid lines in FIG. 6. As the current increases in winding 20 as illustrated at 95, energy will be stored in transformer 22. When the current reaches level 97, transformer 28 causes control circuit 26 to conclude pulse 93. Therefore, the current rapidly falls off as indicated at 99 in FIG. 6 generating the flyback surge. Now, should the input line voltage reduce appreciably, a longer time will be required for the current in winding 20 to increase to level 97, as illustrated at 101 in FIG. 6. When the current reaches level 97, operation of transistor 24 is discontinued, and the current drops at 103 in identical fashion to the drop at 99. Therefore, substantially the same fly-bach surge will be provided, notwithstanding the change in input line voltage. In the present circuit, a wide range between 100 and 400 volts between terminals 16 and 18 will be easily accommodated. Since the primary current always charges transformer 22 to a given energy level, transformer size for a large range of line and load changes is minimized. The transformer 22 in a constructed embodiment was of low weight comprising a small ferrite core transformer. The circuit always operates near its optimum frequency, which is essentially independent of line voltage, assuming the load change is not much greater than ± 20 percent. In practice, this is a satisfactory assumption for instrument circuitry. The circuit also has a high feedback loop gain, with the output power of the whole circuit being linearly dependent upon the operating frequency of the circuit, i.e. the operating frequency of triggered oscillator 72. The operating frequency increases for higher loads. Line voltage variations have no effect upon energy stored, nor the operating frequency, but only on the slope of the charging current waveform as shown at 101 in FIG. 6. The frequency is arranged to be such that build-up of current in the transformer to the desired value can take place, for allowing transformer shut-off before the next cycle starts, despite changes in input line voltage.

In prior circuitry, a plurality of high voltage dissipative regulators were required on the secondary side of the transfomrer, e.g. for each of the low voltage secondary outputs. In such prior circuitry, a single output winding was employed for the high voltage supply, and multiplier means were used for increasing this voltage to the required high voltage value. The output impedance of such a high voltage circuit is sufficiently high that poor regulation tends to result. The large voltage swing between no load and full load together with voltage variations introduced by the transformer rendered a dissipative regulator unrealizable for the high voltage output. Therefore, it was necessary to employ the high voltage output as a voltage reference for the whole circuit. Because of the comparatively large variations encountered, dissipative reregulators are then required on all the other outputs.

A single high voltage winding for producing the proper high voltage output without voltage multipliers cannot be tolerated on a fly-back transformer employed in a voltage regulated supply of the type under discussion, since the ensuing leakage inductance will form a series resonant circuit together with winding capacitance during transformer charge, and a parallel resonant circuit during the time after fly-back when all the rectifier diodes have turned off. Correct operation of the circuit cannot be realized under these conditions.

The present circuit, employing a plurality of lower voltage supplies connected in series, solves the problem inasmuch as the leakage inductance is no longer additive throughout windings 38. The leakage inductance increases by turns ratio squared, and in the present circuit, since each winding 38 has a comparatively smaller number of turns, the leakage inductance does not present the problem it would if a single high voltage winding were employed. The output impedance presented between terminals 44 and 46 is not excessive, and change in voltage with the change in load is reduced. As a consequence, dissipative regulator 48 can be employed if so desired further to regulate the high voltage output. Although it is in some cases desirable to employ a reregulator in the high voltage circuit, it is noted that only one such regulator is so employed, this being an improvement over the requirement of voltage regulating the whole circuit by changing the frequency of operation in response to the high voltage output, while employing a dissipative reregulator on all the low voltage outputs.

Figure 2:
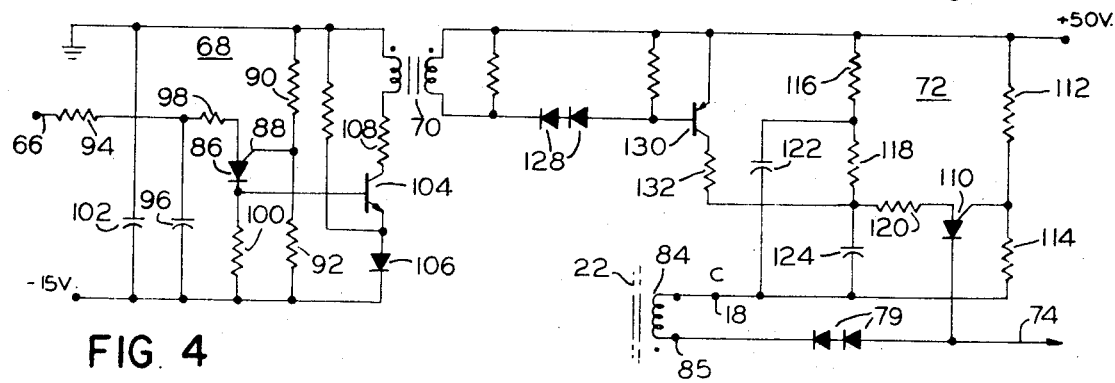
FIG. 2 is a schematic diagram of a voltage-controlled oscillator and a triggered oscillator forming a part of the circuit according to the present invention.

Considering the circuitry represented by portions of the block diagram of FIG. 1, in greater detail, the circuit of FIG. 2 comprises voltage-controlled oscillator 68 together with triggered oscillator 72. Voltage-controlled oscillator 68 receives the output of comparator 64 on lead 66 and, in the normal midrange operation of the comparator under average load conditions, the frequency of oscillator68 68 is controlled to be about 25 kilohertz. The range of frequency thereof is between 20 and 30 kilohertz. This oscillator employs a programmable unijunction transistor, 86, the name being employed therefor by the manufacturer, General Electric Company. The gate terminal 88 thereof is connected to the midpoint of a voltage divider comprising resistors 90 and 92 disposed between ground and a −15 volts, and the voltage at this midpoint acts to fix the turn-on point of the unijunction transistor. Connection 66 from the comparator is coupled through timing resistor 94 to timing capacitor 96, the opposite terminal of which is returned to a −15 volts. Capacitor 96 is disposed across a circuit serially including resistor 98, the anode-cathode path of unijunction transistor 86, and resistor 100, while a filter capacitor 102 is inserted between −15 volts and ground. Capacitor 96 periodically charges up to a value which will cause conduction through the anode of unijunction transistor 86 for applying a positive pulse at the base of transistor 104. Transistor 104 has its emitter coupled to a −15 volts through diode 106, and its collector coupled to ground through the series combination of resistor 108 and the primary of pulse transformer 70. Each time unijunction transistor 86 fires, transistor 104 conducts and provides an output pulse through transformer 70 to triggered oscillator 72.

As the voltage on connection 66 rises, capacitor 96 will charge more quickly to a voltage which will turn on unijunction transistor 86, thereby increasing the frequency of voltage-controlled oscillator 68. Likewise, a lower voltage on connection 66 will lower the operating frequency of the circuit. The voltage at connection 66 rises for increasing the frequency of oscillator 68 as the voltage at connection 62 decreases with respect to ground. Likewise, as the voltage at connection 62 becomes larger, the voltage at connection 66 decreases, for lowering the frequency of oscillator 68, Triggered oscillator 72 would free-run at a frequency lower than the normal operating frequency range of the overall circuit, i.e. below 20 kilohertz. Oscillator 72 again includes a programmable unijunction transistor 110 having its gate connected to the midpoint between resistors 112 and 114 which are serially interposed between a +50 volts and common circuit point C. Common circuit point C is the common return for the control circuitry on the line side of transformers 22 and 70, and is insulated from the instrument ground on the load side of transformers 22 and 70. Point C corresponds to terminal 18 of rectifier and filter 10.

Resistors 116, 118, and 120 are connected serially in that order between the anode of programmable unijunction transistor 110 and a positive 50 volts. A filter capacitor 122 returns the junction between resistors 116 and 118 to common point C, and timing capacitor 124 connects the junction of resistors 118 and 120 to point C. During untriggered operation, capacitor 124 would charge up to a point where conduction would be initiated through unijunction transistor 110 to connection 74, this point being set by the voltage at the transistor's gate terminal. When the unijunction transistor conducts, capacitor 124 is discharged through transistor 126 (see FIG. 3), and then the charging of capacitor 124 would start again. When the circuit according to the present invention is first powered, oscillator 72 can free-run for a short period of time below a frequency of 20 kilohertz before a triggering pulse is applied.

During triggered operation, the impulses from transformer 70 are coupled through diodes 128 to the base of shunting transistor 130, having its emitter connected to a positive 50 volts and its collector coupled to the junction between resistors 118 and 120 by way of resistor 132. The frequency of input of impulses at the base of transistor 130 determines the power supply's output voltage level. Each time an impulse is received at the base of transistor 130, this transistor effectively shunts the timing resistor 118 of oscillator 72 causing oscillator 72 to fire immediately and provide an output pulse or connection 74. Winding 84 on transformer 22 together with diodes 79 comprises a hold-off circuit as hereinafter more fully described.

Figure 3:
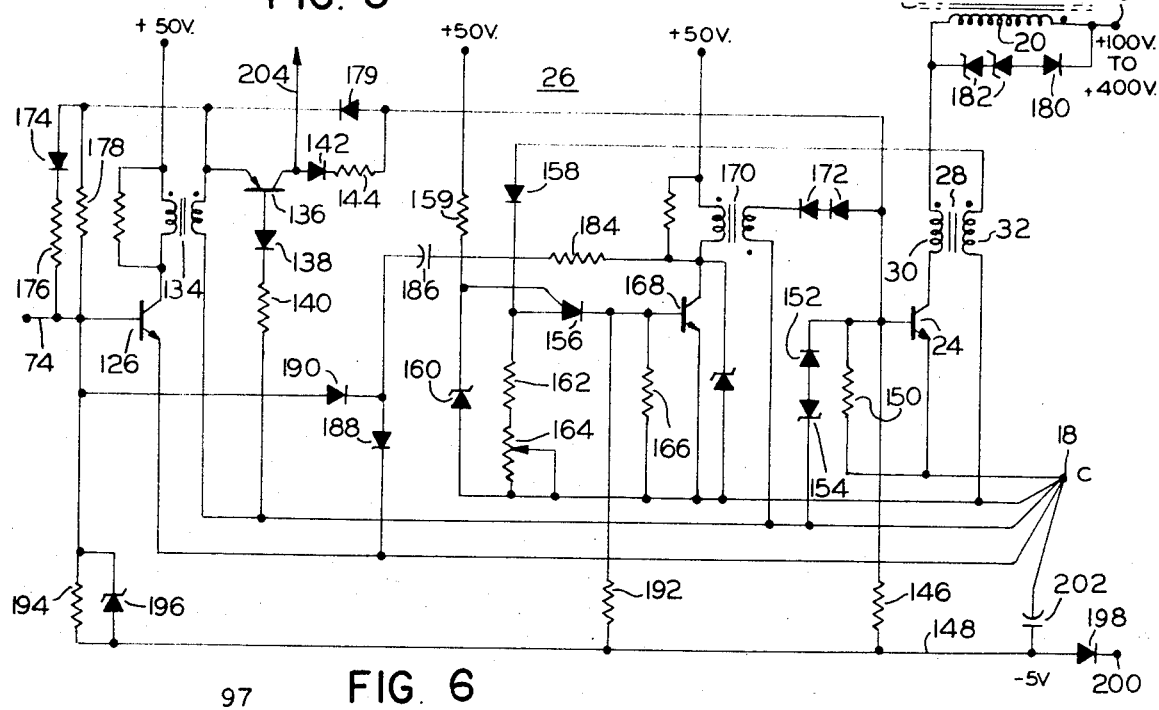
FIG. 3 is a schematic diagram of a control circuit employed according to the present invention.

Referring to FIG. 3, illustrating control circuitry according to the present invention, the output from triggered oscillator 72 is received at connection 74 and is applied to the base of transistor 126, causing transistor 126 to conduct each time an impulse is received. The emitter of transistor 126 is connected to point C, the same common point referred to above for the primary side of the present circuit. The collector of transistor 126 is connected to +50 volts through the primary of transformer 134, the secondary of which is interposed between common point C and the emitter of isolation transistor 136. Transistor 138 is disposed in a common base connection with the base thereof returned to point C through diode 138 and resistor 140, while the collector thereof is coupled to the base of power transistor 24 through diode 142 and resistor 144 in series. Then, when an impulse is received at connection 74, transistor 126 turns on, which, through transformer 134, causes conduction of transistor 136. The collector current of transistor 136 flows through resistor 146 to −5 volt bus 148 and through the base of power transistor 24, causing conduction between the collector and emitter of power transistor 24. As hereinbefore described, power transistor 24 is connected in series with primary winding 20 of transformer 22, and primary winding 30 of transformer 28, between rectifier output terminals 16 and 18. Therefore, the conduction in power transistor 24 results in an increasing current flow through primary winding 20 for "charging" the transformer.

The impulse provided at the connection 74 for turning on transistor 126 is of comparatively short duration, but a feedback circuit including diode 174 in series with resistor 176 maintains transistor 126 in conduction after the conclusion of the inpulse received at connection 74. Diode 174 and resistor 176, across resistor 178, are disposed between the secondary of transformer 134 and the base of transistor 126. The positive voltage at the dotted end of the secondary of transformer 134 when transistor 126 is turned on is coupled via elements 174 and 176 for maintaining conduction in transistor 126. Transistors 126 and 136 are maintained in conduction for the period of time during which conduction is desired for power transistor 24. Thus, transistors 24, 136, and 126 will conduct, for example, for the length of pulse 87 in FIG. 7a.

The base of transistor 24 is returned to point C through esistor 150, and a circuit comprising the series connection of diode 152 and Zener diode 154 prevents the base of transistor 24 from dropping below a predetermined voltage relative to point C. The various circuits are suitably returned to the common point C, separately, as illustrated in the diagram.

When the current through primary winding 20, primary winding 30, and power transistor 24 reaches a predetermined optimum value (optimum or maximum for the transformer's rating), the secondary winding 32 coupled between point C and the anode of programmable unijunction transistor 156 causes the latter to conduct for interrupting the current flow through primary winding 20. This corresponds to the end of pulse 87 in FIG. 7a. A diode 158 couples the marked terminal of secondary winding 32 to the anode of programmable unijunction transistor 156. Resistor 192 returns the cathode of unijunction transistor 156 to −5 volt bus 148. The gate terminal of unijunction transistor 156 is connected to the midpoint of a voltage divider comprising resistor 159 and Zener diode 160 disposed in that order between +50 volts and point C, for setting the turn-on point of unijunction transistor 156. A resistor 162 and a potentiometer 164, having a tap connected for shorting out part of the potentiometer are connected in series between the anode of unijunction transistor 156 and point C. Potentiometer 164 is utilized for determining the relationship between current in winding 20 and the trip point of unijunction transistor 156, thereby determining the value of current flowing in winding 20 which will cause unijunction transistor 156 to conduct. As a waveform of increasing current is sensed by transformer 28, the current is secondary winding 32 flowing through resistor 162 and potentiometer 164 will provide an increasing voltage at the anode of unijunction transistor 156 until the latter fires at a point determined by the voltage drop produced through resistor 162 and potentiometer 164, and by the voltage level of the gate of programmable unijunction transistor 156. When unijunction transistor 156 conducts, current from secondary winding 32 will be conducted through unijunction transistor 156 and resistor 166 to point C, raising the voltage at the base of transistor 168 and causing transistor 168 to conduct.

The emitter of the transistor 168 is connected to point C and the colletor thereof is coupled to +50 volts through the primary of transformer 170. The secondary of transformer 170 is interposed between point C and diodes 172 leading to the base of power transistor 24. When the unijunction transistor 156 conducts, causing transistor 168 to conduct, the resulting voltage at the secondary of transformer 170 causes diodes 172 to conduct and draw current away from the base of transistor 24. That is, the diodes then enforce a reverse current, or supply turn-off current for the power transistor 24, resulting in the interruption of current to winding 20 of transformer 22.

When transistor 24 turns off, interrupting current in winding 20, the magnetic field in the core of transformer 22 collapses for generating the fly-back voltage as hereinbefore described. A circuit comprising diode 180 in series with Zener diodes 182 is employed for suppressing extraneous transient voltages occurring across winding 20.

Transistor 126 is turned off at this time, i.e. at the end of pulse 87 in FIG. 7, through a circuit comprising resistor 184 in series with capacitor 186 and diode 188 connected in that order between the collector of transistor 168 and point C, together with a diode 190 coupled the junction of capacitor 186 and diode 188 to the base of transistor 126. Diode 188 is disposed with its cathode connected to point C, while the cathode of diode 190 is connected to the anode of diode 188. When transistor 168 is turned on, at the time when a predetermined current value is reached in transformer winding 20, the collector voltage of transistor 168 drops, dropping the voltage at the cathode of diode 190. The anode of diode 190 pulls down the base of transistor 126 causing cessation of conduction in transistor 126. The circuit at this time is in a static condition and awaits another impulse at connection 74 for initiating another period of conduction in power transistor 24.

When transistor 126 is turned off through diode 190, a negative voltage appears at the dotted end of the transformer 134 secondary. This causes conduction through diode 179 from the base of transistor 24 for further aiding in turning off transistor 24. Diode 179 thus assists diodes 172 in their turn-off function.

A minus 5 volt power supply is provided by diode 198, connected between terminal 200 and bus 148, with a filter capacitor 202 being disposed between bus 148 and point C. Terminal 200 is connected to terminal 85 of holdoff winding 84 on the transformer 22 for generating this small negative bias voltage. (See FIG. 2.) The power supply function is an incidental function for the holdoff winding. Zener diode 196, connected across resistor 194 between the base of transistor 126 and −5 volt bus 148, acts as an overvoltage protective device in the event of a failure in the comparator 64 which might lead to too high an operating frequency and excessive supply output voltages. If the −5 volt supply were to become too negative, Zener diode 196 would prevent positive pulses from reaching the base of transistor 126. The supply will then restart, but if the overvoltage type of fault again occurs, the supply will again shut down.

The holdoff circuit, comprising holdoff winding 84 and diodes 79 in FIG. 2, is provided as hereinbefore indicated to prevent power transistor 24 from being turned back on during the time of generation of a high voltage fly-back impulse. During the presence of a high voltage fly-back surge, a negative voltage will be applied via diodes 79 to the base of transistor 126 in FIG. 3. Thus, transistor 126 cannot initiate conduction in power transistor 24 until the conclusion of the fly-back impulse as detected by holdoff winding 84. Turn-on of power transistor 24 during the presence of a fly-back impulse could destroy power transistor 24.

Figure 5:
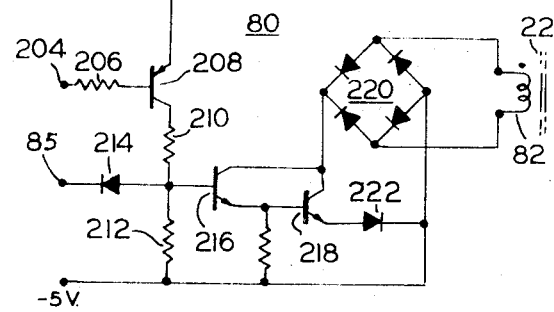
FIG. 5 is a schematic diagram of a gated damper circuit in accordance with the present invention.

To prevent ringing at the conclusion of the fly-back surge, a gated damper circuit 80 is employed, as illustrated in FIG. 5. Connection 204 from the collector of isolation transistor 136 in FIG. 3 is coupled through resistor 206 to the base of transistor 208 (FIG. 5), having its emitter connected to common point C and its collector coupled to −5 volts through a voltage divider comprising resistors 210 and 212 in series. When transistor 126 of FIG. 3 turns off as a predetermined current is reached in winding 20, the resulting negative signal at the collector of transistor 136 turns on transistor 208 of FIG. 5. As a consequence, the junction between resistors 210 and 212 tends to rise. However, diode 214, interposed between such junction and terminal 85 of holdoff winding 84 (FIG. 2), holds the voltage down. During the presence of the fly-back impulse, diode 214 conducts, and prevents its anode from going positive. Then, at the conclusion of the fly-back impulse, terminal 85 of the holdoff winding 84 will no longer be negative, and the junction between resistors 210 and 212 is permitted to rise, transistor 208 still being turned on.

The junction between resistors 210 and 212 of FIG. 5 is connected to the base of transistor 216, which is disposed in a Darlington configuration with transistor 218. A conventional bridge rectifier 220 is interposed between the collectors of transistors 216 and 218, and the cathode of a diode 222 disposed between the emitter of transistor 218 and a −5 volts. Transistors 216 and 218 conduct, when the unction between resistors 210 and 212 rises, completing a circuit through damper winding 82 of transformer 22. At this time, which is after the conclusion of the fly-back impulse, winding 82 is thus substantially shorted by bridge rectifier 220, which damps such ringing as may tend to occur. The damper winding 82 remains in the shorted condition until the eception of another impulse at connection 74 of the control circuitry.

Figure 4:
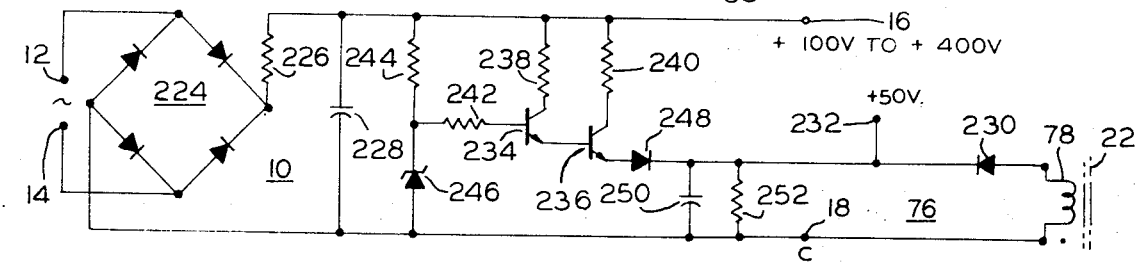
FIG. 4 is a schematic diagram of a line rectifier circuit, low voltage power supply, and starting circuit employed according to the present invention.

The rectifier and filter 10, as illustrated in FIG. 4, comprises a bridge rectifier 224 disposed in a conventional connection between input terminals 12 and 14, and a resistor 226 coupling the bridge to the filter capacitor 228. A DC voltage of between 100 and 400 volts is typically provided at terminal 16 with respect to terminal 18 in response to application of an AC voltage in the range of 90 volts rms to 272 volts rms at a frequency of 48 cycles or greater. This represents the range of line voltages common throughout the world. However, the invention in a broader sense is not limited to this specific voltage range.

During circuit operation, the +50 volts employed on the line side of the transformers is derived from a low voltage power supply 76, also illustrated in FIG. 4. This low voltage supply comprises winding 78 on transformer 22, and diode 230 disposed between one end of winding 78 and the +50 volt output terminal 232. The remaining end of winding 78 is returned to common terminal C. A filter circuit comprising capacitor 250 across resistor 252 also forms a part of power supply 76, the parallel combination being connected between terminal 232 and common point C.

It will be appreciated that when the apparatus is initially turned on, that is, when power is initially applied at terminals 12 and 14, there will be no flux change in transformer 22 as would generate the desired voltage in winding 78. Therefore, a turn-on circuit is employed. This turn-on circuit comprises transistors 234 and 236 in a Darlington configuration having their collectors connected to terminal 16 via resistors 238 and 240, respectively. The base of transistor 234 is coupled, via resistor 242, to the midpoint of a voltage divider comprising resistor 244 and Zener diode 246 disposed in that order between terminal 16 and terminal 18. The emitter of transistor 234 is connected to the base of transistor 236, with the emitter of transistor 236 being connected to +50 volt output terminal 232 by means of diode 248. Thus, a predetermined voltage level present at the cathode of Zener diode 246 is applied at the base of transistor 234 causing transistor 236 to conduct through diode 248 and provide a starting voltage across capacitor 250 and resistor 252. However, this voltage is arranged to be less than 50 volts, and after the overall circuit has started, diode 248 will be back-biased by operation of the normal low voltage supply 76. That is, the voltage at the cathode of diode 230 will then be 50 volts, exceeding the voltage at the anode of diode 248, thereby cutting off diode 248.

The general operation of the circuitry thus described has been set forth in connection with the block diagram of FIG. 1. The power supply according to the present invention is capable of operating over a very wide input voltage and frequency range, and with changes in load on the order of approximately plus or minus twenty percent. The supply is capable of providing a given low voltage output, to which the comparator 64 is connected, controlled to be constant within narrow limits. All other low voltage output windings are suitably closely coupled to the output winding to which the comparator is connected, so these other output voltages have remained constant within two or three percent in the case of a particular portable oscilloscope circuit operated by the present power supply. Dissipative reregulators are therefore unnecessary for the other low voltages. A dissipative regulator with a range of ten percent of the output voltage was sufficient in the case of the high voltage supply to provide a high voltage output accurate within 0.5 percent. The power supply is quite compact, and of low weight, with a transformer 22 comprising a small ferrite core unit. The power supply operates at high efficiency, typically eighty percent, and the transformer is always charged to full energy storage capability on each impulse cycle, thus utilizing a minimum size transformer to the maximum advantage. The circuit always operates near optimum frequency, which frequency is essentially independent of line voltage. The circuit has a high regulation loop gain, and isolates the line from the instrument or load circuitry.

In this specification and claims, the term "periodic" when applied to a series of waveforms or pulses does not mean such series has an invariable period. Thus, the triggered oscillator, and the control circuit operated thereby, may have a period of operation which varies from one cycle to the next in accordance with the variations in load as may occur.

While we have shown and described a preferred embodiment of our invention, it will be apparent to those skilled in the art that many changes and modifications may be made without departing from our invention in its broader aspects. We therefore intend the appended claims to cover all such changes and modifications as fall within the true spirit and scope of our invention.

We claim:

1. A power supply comprising:
    a transformer having a primary winding means and secondary winding means;
    a DC input source;
    a control device serially interposed between said DC input source and said primary winding means;
    a current sensing transformer having a primary winding connected in series with said primary winding means and said control device, said current sensing transformer also having a secondary winding;
    a control circuit for operating said control device to thereby couple current from said input source to said primary winding means and to the primary of said current sensing transformer; oscillator means for periodically operating said control circuit;
    said control circuit being responsive to the output of the secondary of said current sensing transformer to discontinue operation of said control device when the current in the primary of said current sensing transformer reaches a predetermined value for interrupting such current and initiating collapse of the field established in said transformer;
    and a damper winding on said first mentioned transformer operated by said control circuit for heavily loading said first mentioned transformer after the collapse of the field in said first mentioned transformer subsequent to the interruption of current in said primary winding means and before said control circuit again operates said control device to couple current from said input source to said primary winding means.

2. The circuit according to claim 1 wherein said input source comprises a rectifier for receiving an alternating current input and for providing a direct current output to said primary winding means.

3. The circuit according to claim 1 wherein said oscillator means is responsive in its frequency of operation to a voltage derived from said secondary winding means for increasing the frequency of operation of said oscillator as said voltage derived from said secondary winding means tends to decrease.

4. The circuit according to claim 3 including means for coupling a load to the secondary of the first mentioned transformer comprising rectifier means in series with said secondary winding means and filter means for developing an output voltage;
    said oscillator means further including a comparator means for comparing said voltage derived from said secondary winding means with a reference for controlling said oscillator in accordance with such comparison.

5. The circuit according to claim 3 wherein said oscillator means operates at frequencies which allow a period of nonconduction between periodic operations, said period of nonconduction having a time duration ufficient for allowing variation in the time interval current from said input source and through said primary of said current sensing primary flows in order that said current can reach said predetermined value during said interval, before the next periodic operation.

6. The circuit according to claim 3 wherein said secondary winding means comprises a plurality of output windings, said circuit further including means for coupling a load to said first transformer comprising a filter means associated with each said output winding, and rectifier means coupling each such filter means to the associated output winding;
    and means connecting said filter means in series-aiding relation to provide a high voltage output in response to periodic collapse of the field established in said first transformer.

7. The circuit according to claim 6 further including a dissipative voltage regulator means for coupling the series connection of said filter means to a high voltage load.

8. The circuit according to claim 1, further including a holdoff winding on said transformer coupled to said control circuit for preventing conductive operation of said control device during the collapse of the field in said transformer after interruption of said current.

9. The circuit according to claim 1 wherein said control device comprises a power transistor.

10. The circuit according to claim 1 further including first means in said control circuit for energizing said control device in response to an input from said oscillator means, said first means being adapted to operate for a variable period until shut off, and means also responsive to the output from the secondary of said current sensing transformer for turning off said first means.

11. The circuit according to claim 1 wherein said control device is a power transistor.

* * * * *

UNITED STATES PATENT OFFICE
CERTIFICATE OF CORRECTION

Patent No. 3,742,371        Dated June 26, 1973

Inventor(s) Arthur H. Seibt and Frank T. Churchill

It is certified that error appears in the above-identified patent and that said Letters Patent are hereby corrected as shown below:

Column 1, line 59, "is" should be --in--.
Column 3, line 25, "illustrated" should be --illustrating--.
Column 4, line 51, "thereby" should be --whereby--.
Column 5, line 6, "53" should be --52--.
Column 5, line 55, "hereinabove" should be --hereinbefore--.
Column 5, line 63, "89/ and 91!" should be --89' and 91'--.
Column 6, line 48, "transfomrer" should be --transformer--.
Column 7, line 34, "oscillator68 68" should be --oscillator 68--.
Column 7, line 47, "to a -15 volts" should be --to -15 volts--.
Column 8, line 4, "oscillator," should be --oscillator.--.
Column 8, line 45, "or" should be --on--.
Column 8, line 46, "comprises" should be --comprise--.
Column 8, line 60, "138" should be --136--.
Column 9, line 14, "inpulse" should be --impulse--.
Column 9, line 27, "esistor" should be --resistor--.
Column 9, line 60, "is" should be --in--.
Column 10, line 29, "coupled" should be --coupling--.
Column 11, line 41, "unction" should be --junction--.
Column 11, line 49, "eception" should be --reception--.
Column 12, line 45, "or" should be --to--.
Column 14, line 12, "oscillatormeans" should be --oscillator means--.
Column 14, line 15, "ufficient" should be --sufficient--.

Signed and sealed this 8th day of January 1974.

(SEAL)
Attest:

EDWARD M. FLETCHER, JR.            RENE D. TEGTMEYER
Attesting Officer                  Acting Commissioner of Patents